United States Patent [19]  
Schmitt-Henco et al.

[11] 3,928,058  
[45] Dec. 23, 1975

[54] EXPANDED SYNTHETIC CALCIUM SILICATES

[75] Inventors: Carl Heinrich Schmitt-Henco, Mainz; Eberhard Rauschenfels, Wiesbaden, both of Germany

[73] Assignee: Dyckerhoff Zementwerke A.G., Wiesbaden, Germany

[22] Filed: Dec. 20, 1972

[21] Appl. No.: 317,021

[30] Foreign Application Priority Data
Dec. 21, 1971 Germany............................ 2163384
Sept. 9, 1972 Germany............................ 2244299

[52] U.S. Cl.................................. 106/306; 106/120
[51] Int. Cl.²......................................... C09C 1/02
[58] Field of Search............... 106/306, 288 B, 120; 423/331

[56] References Cited
UNITED STATES PATENTS

| | | | |
|---|---|---|---|
| 2,263,606 | 11/1941 | Balassa | 106/306 |
| 2,547,127 | 4/1951 | Kalousek | 423/331 |
| 3,238,052 | 3/1966 | Burak et al. | 106/120 |
| 3,470,005 | 9/1969 | Flachsenberg et al. | 106/87 |

*Primary Examiner*—Winston A. Douglas  
*Assistant Examiner*—J. V. Howard  
*Attorney, Agent, or Firm*—Weiser, Stapler & Spivak

[57] ABSTRACT

The invention relates to expanded synthetic calcium silicates, particularly of a kind having a white or other pure colour.

13 Claims, No Drawings

EXPANDED SYNTHETIC CALCIUM SILICATES

Expanded synthetic additives for lightweight cements and components are known in the art. Usually they are prepared at high temperatures by a suitable calcining process from ceramic raw materials which can be expanded, such as special clays, argillaceous slates and shales. During the process of expansion these aluminium silicates are in a state known as pyroplastic, that is to say the external pores of a moulding close and form a substantially gastight skin, whereas at the same time in the interior a gas is evolved by thermal dissociation of a component of the raw material and expands the moulding which is internally sufficiently viscous.

In order to prepare the expanded lightweight additive several technically perfected methods have already been developed which permit the process of expansion to be satisfactorily controlled. The most favoured process comprises calcining in a single or two-part rotary kiln.

Besides the expanded products of aluminium silicates granulated calcium hydrosilicates which may be porous are also known, and which can then be used as lightweight additives. These granular additives are hydrothermally produced in an autoclave from a reactive blend of raw materials. They do not possess an expanded structure.

Lightweight additives, such as expanded clay, expanded shale, foamed glass and others are primarily used for the production of lightweight concretes. However, to the extent their appearance is sufficiently attractive they are also being increasingly used as a decorative gravel for discouraging weeds on garden paths and parkways as well as in tubs containing plants. Frequently visible bays in buildings are of lightweight concrete construction, particularly when they have the form of large surface panels intended for prefabricated buildings. The production of a lightweight concrete for such surfaces is nevertheless beset with difficulties because of the unattractive appearance and frequently uneven colouring of conventional expanded lightweight additives and special steps must be taken to prevent the additive grain from showing in the visible surface. This is of major importance in the production of a lightweight concrete based on white cement and intended for the construction of visible surfaces.

Furthermore, because of their natural colour imparted to them by coloured constituents of the raw materials conventional expanded lightweight additives are incapable by the incorporation of further additions or by undergoing some processing of being adjusted to a desired colour specification or of exhibiting pure colours. Consequently colour schemes in the layout of visible lightweight concrete surfaces by using coloured lightweight additives and coloured cements were in the past incapable of achievement. Conventional lightweight additives usually also have a colour inside which differs from that of their external skin so that a surface treatment of the lightweight concrete involving the destruction of the primary grain is also impossible.

In the case of expanded clays and shales the composition of the raw material and the production process do permit residual reactive calcium oxide still to be present, which will then be slaked when exposed to water and form calcium hydroxide with an accompanying considerable increase in volume. In the processed state this usually leads to concrete components being shattered. The necessity of keeping the concrete wet in order to slake the calcium oxide is an additional operation when the concrete is placed and calls for substantially longer setting times of the hardened concrete.

The present invention relates to expanded synthetic calcium silicates having a raw grain density below 1.5 g/cc, which are white or possess a defined white colour inside and outside as the result of controlled pigmentation, and in which all the calcium oxide is present in bound form.

The expansion of calcium silicates would not have readily suggested itself because these materials have a very narrowly defined melting range and a low viscosity when molten. Advantage is taken of these properties, more particularly in the production of steel, for the formation of slag, since the addition of calcium oxide produces a molten slag which is bound to calcium silicate and which in a specific temperature range possesses an extremely low viscosity. However, unexpectedly it has been found that calcium silicates of a given composition are pyroplastic in suitable temperature ranges and will expand. According to the invention it has thus proved possible by conventional methods to produce calcium silicates having a raw grain density below 1.5 g/cc. Starting materials are calcium silicates synthesised from components containing calcium oxide and silica, or industrial wastes having chemical analyses within the following ranges:

20 to 55% by weight of CaO
27 to 60% by weight of $SiO_2$
0 to 27% by weight of $Al_2O_3$ Particularly calcium silicates taken from the following ranges can be very easily expanded:

30 to 50% by weight of CaO
44 to 55% by weight of $SiO_2$
4 to 14% by weight of $Al_2O_3$ Starting products consisting of 33 ± 4% by weight of CaO
55 ± 3% by weight of $SiO_2$
11 ± 3% by weight of $Al_2O_3$ exhibit a nearly ideal pyroplasticity at temperatures above 1,150°C.

Suitable raw materials containing calcium oxide for synthesising the calcium silicates are, more particularly, calcium oxide, calcium hydrate or other calcium salts, as well as limestone and calcareous marl. The component containing silica can be selected, for instance, from quartz powder, silica gel or other silica forms. The natural raw materials frequently also contain alumina so that the $Al_2O_3$ content must sometimes be adjusted. Kaoline and other kinds of clay can be used for the purpose. By adding components containing fluorine and/or alkali metal, such as fluorspar or water glase, in quantities up to about 10% by weight, as well as by adding titanium oxide in quantities up to about 5% by weight the process of expansion can be favourably influenced. Likewise suitable for the production of the proposed synthetic expanded calcium silicates are industrial wastes, for instance the slag meld obtained in the electrochemical production of phosphorus. In conventional manner this melt is quenched with water and contaminants may be mechanically removed from the resultant vitreous, brownish slag sand.

In order to be expanded the finely ground raw materials are thoroughly mixed. Expansion aids, such as heavy oil, sulphite waste liquor, carbon, sulphates and so forth, are added and, after having been wetted, the mass is formed into small, say round or barrel-shaped pellets which are calcined by conventional methods at temperatures of at least 1,150°C, preferably between 1,200° and 1,300°C until the pellets lose their colour and are at the same time expanded.

Components containing $SiO_2$ and $Al_2O_3$, such as silica gel and kaolin, may be added to the slag sand in quantities up to about 25% by weight. Furthermore, substances containing alkali metals and fluorine may also be added in quantities rising to about 10% by weight as well as $TiO_2$ up to about 5% by weight.

The expanded product has a raw grain density below 1.5 g/cc; it has the form of spherical beads of a size between 1 and 20 mm diameter and of uniform structure. The grain is pure white inside and outside, and also possesses a rough, external sealing skin formed by vitrification as well as numerous small bubbles in its interior separated by thin porous parting walls.

The proposed expanded synthetic calcium silicates can be coloured as may be desired in an inexpensive way by using conventional, coloured oxides. The oxides may be added to the raw material mix prior to the production of the calcium silicate, or to the expanding mass. The quantity of these additions depends upon the desired intensity of the colour. In this way monochrome expanded beads which have the same colour inside and outside, and which possess the properties of the white products can be obtained.

The following Table 1 contains the results of expansion tests performed with calcium silicates having compositions within the above specified ranges:

Table 1

| Expanded Calcium silicate | Chemical Composition in % | | | | | Expanding temp. (°C) | Raw Grain density in g/cc. |
|---|---|---|---|---|---|---|---|
| | CaO | $SiO_2$ | $Al_2O_3$ | $K_2O$ +$Na_2O$ +$Fe_2O_3$ | MgO | | |
| 1 | 53.75 | 38.68 | 5.18 | 0.93 | 0.58 | 1250 | 1.09 |
| 2 | 24.42 | 58.11 | 15.45 | 1.68 | 0.33 | 1225 | 0.88 |
| 3 | 22.86 | 47.64 | 23.62 | 2.51 | 3.35 | 1200 | 1.48 |
| 4 | 38.01 | 57.84 | 2.93 | 0.69 | 0.52 | 1250 | 1.10 |
| 5 | 44.59 | 29.17 | 25.01 | 0.85 | 0.38 | 1225 | 1.37 |

It will be seen that the raw grain densities of the expanded products are all below 1.5 g/cc.

The production of the proposed lightweight additives and their properties will be hereunder illustrated by the description of a number of examples:

Example 1

By melting down a mixture of calcium oxide, kaolin and quartz powder a calcium silicate was obtained which consisted of 31% by weight of CaO, 55.5% by weight of $SiO_2$ and 13.5% by weight of $Al_2O_3$. The melt was quenched and then formed a fine-grained slag sand. 2% by weight of heavy oil were added and the same was then wetted with water, so that after thorough kneading it could be moulded into column-shaped pellets (diameter 0.8 cm, height 1.0cm). These were expanded at 1,200°C by the usual three-stage method used for the examination of expanded clays, i.e. they were first dried at 105°C until their weight remained constant, then they were slowly heated in another furnace to 650°C and finally transferred directly to a third furnace which was already at the expanding temperature of 1,200°C. In this latter furnace expansion took place on a platinum tray on which a coarse quartz sand has been scattered. The samples were left for 10 minutes and then allowed to cool in the open air without further manipulation. The expanded beads were white inside and outside, they possessed a rough outer sealing skin formed by vitrification and a bubble-like structure. The bubbles did not intercommunicate, but were separated by thin porous walls, The density of the raw grain was 0.6 g/cc.

Example 2

60% by weight of a fine-grained purified phosphorus slag, 25% by weight of kaolin and 15% by weight of an amorphous silica were carefully mixed and then sufficiently wetted with a liquid consisting of 90% by vol. of water and 10% by vol. of sulphite waste liquor, for the mass having been thoroughly kneaded, to be moulded into column-shaped pellets. After further proceeding, as already described in Example 1, expanded products were obtained which had a raw grain density of 0.5 g/cc and a structure as well as external skin similar to those described in Example 1.

Example 3

A mixture of calcium oxide, kaolin and quartz powder was molten down to a calcium silicate which consisted of 36% by weight of CaO, 54.4% by weight of $SiO_2$ and 9.5% by weight of $Al_2O_3$. The melt was quenched and a fine-grained slag sand was formed. This was wetted sufficiently with a liquid consisting of 90% by vol. of water and 10% by vol. of a 50% solution of monoaluminum-phosphate (fire resistant binder), for the mixture, after having been thoroughly kneaded, to be moulded into column-shaped pellets. These pellets were expanded as described in Example 1. Expanded products were thus obtained which had a grain density of 0.5 g/cc, a bulk weight of 262 g/litre and absorbed water as follows:

| | |
|---|---|
| 0.5 hours | 4.6% |
| 1 hour | 5.4% |
| 3 hours | 6.2% |
| 6 hours | 7.6% |
| 24 hours | 13.2% |

This experiment showed that surprisingly not only conventional expansion aids favourably affect the expansion of the raw materials but that a 50% solution of monoaluminum-phosphate is also particularly suitable for this purpose. When using this substance as an expansion aid the structure and external skin were likewise as described in Example 1.

Example 4

The calcium silicate that had been molten down as described in Example 3 was provided with 0.05% by weight of $Cr_2O_3$ in the form of an aqueous solution of $(NH_4)_2Cr_2O_3$. Otherwise the procedure was the same as in Example 3.

Expanded beads resembling those in the preceding Examples were obtained. However, inside and outside they exhibited a uniformly light green colour. The expanded beads had a raw grain density of 0.6 g/cc, a bulk weight of 291 g/lite and they absorbed water as follows:

| | |
|---|---|
| 0.5 hours | 1.4% |
| 1 hour | 2.1% |
| 3 hours | 2.7% |
| 6 hours | 3.6% |
| 24 hours | 5.7% |

Example 5

A calcium silicate molten down as described in Example 3 was provided with 0.5% by weight of CoO in the form of an aqueous solution of $Co(NO_3)_2$. Otherwise the procedure described in Example 3 was followed. Expanded beads similar to those in the preceding Examples were obtained. However, inside and outside they were now of a uniform deep blue colour. The expanded beads had a raw grain density of 0.4 g/cc, a bulk weight of 220 g/l and absorbed water as follows:

| | |
|---|---|
| 0.5 hours | 4.5% |
| 1 hour | 6.7% |
| 3 hours | 7.5% |
| 6 hours | 9.3% |
| 24 hours | 12% |

The calcium silicate that had been expanded as proposed by the invention was used for the production of a lightweight concrete which was compared with products normally obtainable in the trade. The conditions of the tests and the results are listed in Table 2.

Table 2

| | | Test 1 | Test 2 | Test 3 | Test 4 |
|---|---|---|---|---|---|
| Proportion of cement | kg/m³ | 272 | 307 | 292 | 297 |
| Water/cement factor | — | 0.97 | 0.86 | 0.94 | 0.95 |
| Proportion of additives, total | kg/m³ | 480 | 469 | 449 | 476 |
| Composition of additives:- | vol.% | | | | |
| Expanded product I 0-3 mm | | 45 | 45 | 45 | 45 |
| Expanded product II 3-10 mm | | — | — | — | 20 |
| Expanded product II 10-16 mm | | — | — | 55 | 35 |
| Proposed calcium silicate 10-16 mm | | 55 | 55 | — | — |
| Dry raw density of the finished concrete after 7 days | kg/m³ | 806 | 837 | 799 | 832 |
| Compressive strength after 7 days | kp/cm² | 41 | 60 | 47 | 55 |

It will be gathered from Table 2 that concrete containing the expanded calcium silicate according to the invention can be more economically produced and that roughly the same results regarding raw density and compressive strength (tests 1 and 3) can be achieved because significantly less cement and more additive are required. Similarly, for the same consumption of cement a product of greater strength can be obtained having the same raw density (test 2 and test 3). From the point of view of the operations at the site the concrete produced with the proposed calcium silicate (test 2) is better than that produced with the conventional lightweight additives (test 4) because only one class of grain is needed in the former.

A comparison of other physical characteristics with those of conventional lightweight additives underlines the superiority of the proposed expanded calcium silicate. For example, the raw density of grain above 5 mm diameter is generally less than 0.8 g/cc and thus extremely low. With due reference to net density the calculated porosity is about 80% by vol. and this indicates an extremely low thermal conductivity and hence a high heat transfer resistance. The mean dynamic elastic modulus of about $4.0 \cdot 10^4$ kp/cm² is extremely favourable for the use of the expanded product as a loose filling for acoustic and thermal insulation.

Without any variation of grain size and grain structure the proposed white or coloured calcium silicate is suitable for use not only as an additive in reinforced and unreinforced lightweight concrete but also as an additive in the production of plaster-bound building components, plastics-bound building components. Moreover, it can be used in its white or coloured form as a filler in foamed synthetic plastics and as a decorative gravel.

In finely ground form the coloured or uncoloured expanded calcium silicate is also a useful inert filler for thermoplastic and duroplastic materials.

Particular advantages are gained when using the proposed expanded synthetic calcium silicate for the production of lightweight silica concretes having raw densities between 0.7 and 1.4 g/cc.

Silica concretes are hydrothermally hardened building materials bound by hydrated calcium and produced under about 8 to 16 atg (atm.gauge) at 170° to 200°C in an autoclave. According to the dimensions of the products and the properties of their structure they can be classified as sand-lime bricks, dense silica concrete for prefabricated components and gas concrete for bricks and prefabricated parts.

Gas concretes usually have raw densities under 0.8 g/cc, sand-lime bricks and dense silica concretes densities exceeding 1.4 g/cc. The intervening range of raw densities could not hitherto be provided by hydrothermally hardened building materials. Consequently properties which depend upon the raw desnity, such as thermal conductivity, acoustic insulation properties, compressive strength, could not be provided in every desired combination in hydrothermally hardened building materials. Furthermore, the adhesion of renderings and mortars to gas concrete surfaces presents a problem that has not yet been effectively solved, whereas in the case of sand-lime bricks and dense silica concrete satisfactory adhesion to renderings and mortars are achieved. These results are primarily due to the smooth surface of gas concretes which are a consequence of the production process. Moreover, water absorption and release by gas concretes are governed by their capillary-destroying spherical pores which are unsatisfactory when compared with sand-lime bricks and dense silica concrete so that there is a demand for a lightweight silica concrete which will combine the favourable properties of sand-lime bricks of the dense silica concretes.

In order to reduce the raw densities of sandlime bricks and dense silica concretes it is possible to provide cavities inside the brick by special moulding techniques. The low density bricks or floor slabs and beams thus obtained nevertheless make higher demands upon the stability of the raw mouldings so that this method cannot be accepted as being a satisfactory solution.

The proposed lightweight silica concretes are hydrothermally produced from mixtures of CaO component and an additive of perceptibly lower density than quartz which will react with calcium oxide under hydrothermal conditions. Building limes and cements or mixtures of these conventional binders are used as the CaO component. As a reactive additive the expanded synthetic calcium silicate either alone or in mixture with ordinary silica components, for instance quartz powder or quartz sand, can be used for the hydrothermal production of silica concrete. The desired density can also be varied by adding substantially inert additives, such as blast furnace slag, fly ash and so forth. The lightest products are obtained if the silica component consists exclusively of the expanded synthetic calcium silicate of uniform grain structures. Since a quantity, though this may be only small, of the calcium oxide component will always be necessary as a binder the content of expanded synthetic calcium silicate may be between 1 and 95% by weight, preferably between 10 and 95% by weight. The best results are obtained when the proportions are between 50 and 90% by weight. Besides the necessary content of the calcium oxide component as a binder, amounting to between about 5 and 25%, and the desired proportion of the expanded synthetic calcium silicate, varying quantities of conventional $SiO_2$ components or inert substances may also be added for adjusting the properties as may be desired.

The technology of the proposed lightweight silica concretes is the same as that of sand-lime bricks and dense silica concretes. Their production from expanded synthetic calcium silicate was by no means obvious because it is a well known fact that calcium silicates poor in CaO react very sluggishly in the hydrothermal process and they are therefore primarily considered to be inert additives. This applies for instance to blast furnace slag which is not used in gas concretes as a binder component unless it is basic in character and partly sets before the autoclave process begins. However, surprisingly it transpires that expanded synthetic calcium silicate reacts under hydrothermal conditions with the CaO component of the mixture and forms calcium silicate hydrates and that in this way the grains of the expanded additives are cemented together.

The raw density of the lightweight silica concrete can be varied by an appropriate choice of specific grain size ranges of the expanded synthetic calcium silicate and/or by the addition of inert or reactive components to the initial mix. The final strengths of the lightweight silica concretes can be improved by small additions of quartz powder and/or ground phosphorus slag. Moreover, the addition of ground expanded calcium silicate is advantageous, the latter participating as an active reagent in the hydrothermal process in the same way as the unbroken expanded additive.

The products obtainable from the proposed lightweight silica concrete range from conventional sand-lime brick shapes, orifice and cavity bricks to large section prefabricated parts, such as wall elements, slabs, blocks and beams. For the satisfaction of static structural requirements large section finished parts may be provided with reinforcement. These products are obtained by the conventional method of producing dense silica concrete elements.

Furthermore, the proposed lightweight silica concrete products may be machined when they are hard. For this purpose the methods used in the production of gas concrete can be applied, such as the milling of slots and fibres and the cutting of finished components by sawing.

The hydrothermal product is also extremely white due to the internal and external pure whiteness of the expanded synthetic calcium silicate, so that the use of this building material at once suggests itself for the construction of visible walls and the design of facades. By using any one or more of the intensely coloured expanded calcium silicates coloured lightweight silica concretes can be produced which unlike the known types of coloured sand-lime bricks have particularly evenly coloured surfaces.

The advantageous employment of the expanded synthetic calcium silicates for the production of lightweight silica concretes will now be illustrated by the description of the following Examples 6 and 7.

Example 6

10 kg of white expanded synthetic calcium silicate having particle sizes between 1 and 25 mm. distributed in this range according to the Fuller curve, were carefully mixed in an Eirich mixer, with the addition of water, with 1.04 kg of fine white lime (corresponding to 10 percent by weight of CaO). From this mix cubes having a side length of 10 cm were compacted by the application of a pressure of 150 kp/cm². The compacts possessed sufficient edge strength to be handled without giving trouble. They were heated in an autoclave at the rate of 6° per minute and hardened at 16 atg (atm.gauge) for 4.5 hours (corresponding to 72 atg × 1 hour) with steam. After cooling, the compressive strength of the pure white silica concrete cubes averaged 105 kp/cm², their raw density being 1.10 g/cc.

Example 7

Another mix was prepared as described in Example 6. This contained 6.7 percent by weight of CaO, 33 percent by weight of white expanded synthetic calcium silicate having particle sizes between 5 and 15 mm likewise distributed according to Fuller's curve, balance quartz sand 0.09 to 1 mm. From this mix cubes having a side length of 10 cm were compacted as described in Example 6 and then hardened in an autoclave for 4.5 hours at 16 atg with steam. The raw density of the pure white silica concrete was 1.37 g/cc, its compressive strength being 160 kp/cm².

We claim:

1. Synthetic calcium silicate expanded beads having a bubble-like structure, having an external sealing skin and numerous small non-intercommunicating air bubbles in the interior of the bead separated by thin walls, the beads comprising as major constituents CaO and $SiO_2$ and having a raw grain density below 1.5 g/cc.

2. The expanded calcium silicate beads of claim 1, which are white.

3. The expanded calcium silicate beads of claim 1 of the following composition:
  20 to 55% by weight of CaO
  27 to 60% by weight of $SiO_2$
  0 to 27% by weight of $Al_2O_3$ 4. The expanded calcium silicate beads of claim 3 of the composition:
  30 to 50% by weight of CaO
  44 to 55% by weight of $SiO_2$
  4 to 14% by weight of $Al_2O_3$ 5. The expanded calcium silicate beads of claim 4 of the following composition:
   33 ± 4% by weight of CaO
   55 ± 3% by weight of $SiO_2$
   11 ± 3% by weight of $Al_2O_3$ 6. The expanded calcium silicate beads of claim 1 which have a rounded external configuration, particularly of ellipsoidal, egg or spherical shapes.

7. The expanded calcium silicate beads of claim 1 which have a raw grain density of 0.4 to 0.8 g/cc.

8. The expanded calcium silicate beads of claim 1 of a particle size of 1 to 30 mm and a continuous grain size analysis.

9. The expanded calcium silicate beads of claim 1 which have a raw grain density of a grain exceeding 5 mm of less than 0.8 g/cc.

10. The expanded beads of claim 1 which are of a uniform color.

11. The expanded beads of claim 1 which are capable of absorbing less than 10% water in 6 hours.

12. The expanded beads of claim 1 wherein all the calcium oxide is present in bound form.

13. The expanded beads of claim 1 which are of a size of about 1 to 20 mm.

* * * * *